V. VALLET.
ROAD MAP.
APPLICATION FILED JUNE 22, 1911.

1,033,292.

Patented July 23, 1912.
2 SHEETS—SHEET 2.

Witnesses:
Louise Franck
Eugene Wening.

Inventor
Victor Vallet
by
his Attorney

UNITED STATES PATENT OFFICE.

VICTOR VALLET, OF PARIS, FRANCE.

ROAD-MAP.

1,033,292.   Specification of Letters Patent.   Patented July 23, 1912.

Application filed June 22, 1911. Serial No. 634,818.

*To all whom it may concern:*

Be it known that I, VICTOR VALLET, citizen of France, residing at 25 Avenue Gambetta, Paris, in the Republic of France, have invented new and useful Improvements in Road-Maps, of which the following is a specification.

This invention relates to road maps and has for object an improved road map in which the varying level of the roads can be taken in at a single glance so that a traveler can immediately become acquainted with the nature of the roads and when there are more than one route between two points in his journey, can select the one best suited to his means of locomotion.

It has already been proposed to use maps in which the vertical projection of the road is shown by means of vertical sections of the ground taken between selected points and which are represented in a contrasting color to the general color of the map, the respective elevations at the ends of each section being indicated in figures, while the distance between the points selected is indicated by figures on the profile base. Maps have also been proposed in which the longitudinal vertical section of the road is shown on the side of the road, but in such maps, the line of varying thickness which indicates the level of the road does not follow the cartographically accurate line showing the curves of the road, so that the selection between two routes is difficult as it is impossible to at once form a comprehensive conception of the routes and their natural incidents.

The invention consists in an improved road map in which the vertical section of a road is shown folded down into the plane of the map throughout the length of the road and along the cartographically accurate line showing the curves of the road, the lines representing the road being broken or continuous and one of them serving as the base of the vertical section which is represented by any graphical means, whereby the road is given the appearance of being in relief.

Figure 1:
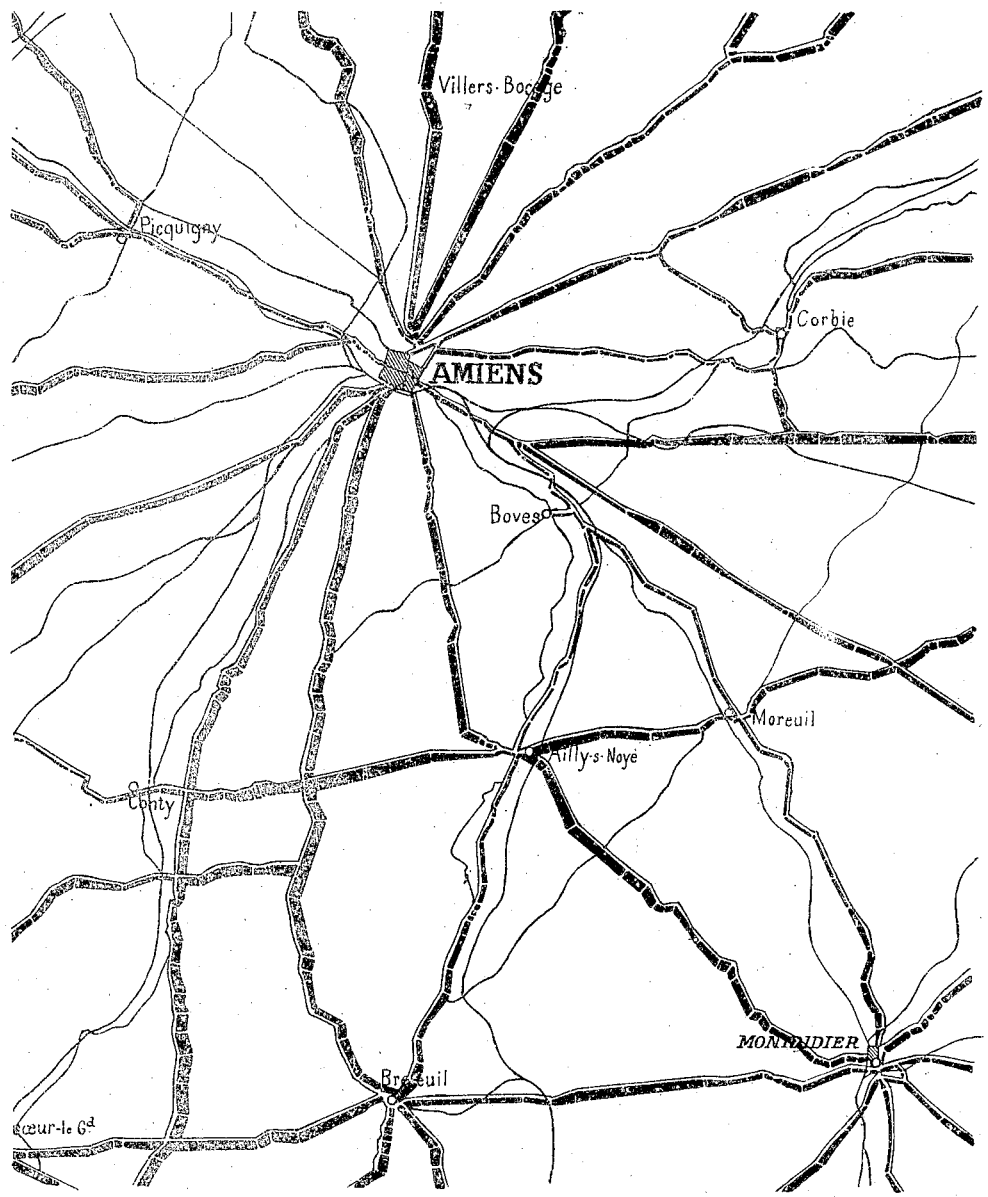
Figure 2:
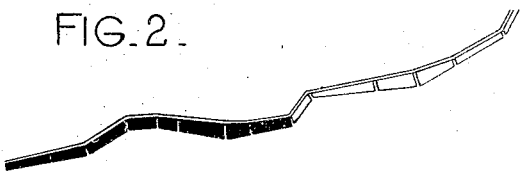
Figure 3:
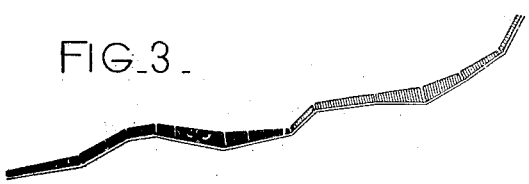

In the accompanying drawings which are given by way of example: Figure 1 shows part of a road map according to the invention in which the relief of the roads is shown folded down into the plane of the map the road itself being represented by a line parallel to the profile edge. Figs. 2–7 illustrate various graphical means of representation.

Referring to Fig. 1 it is seen that each road is shown with its relief folded down into the plane of the map so that each road is shown in the form of a band or chain having divergencies, convergencies and portions of constant breadth. For example, if it is desired to go from Amiens to Montdidier on the map shown in Fig. 1 it is seen that of the two principal roads which may be taken the one passing through Ailly has a number of considerable hills while the other passing through Moreuil is almost uniformly flat. This enables a choice to be made at once with full reason for each choice. Further, in the course of his journey a motorist for example can observe his position by comparing the indications of the map with the gradients which he traverses and consequently, as he is able to see at every instant the gradients which he is going to arrive at, he can regulate the running of his car in the best possible conditions.

Figure 4:
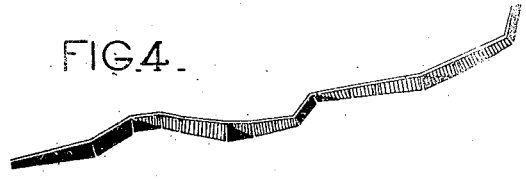

In the method of graphic representation shown in Fig. 4 a graduated lighting of one face is assumed, the light coming from the left, *i. e.* from the west.

Figure 5:
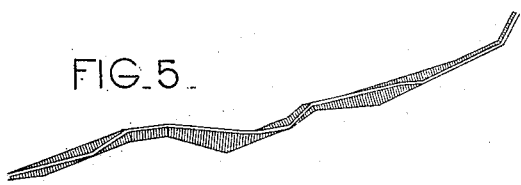

In the method of graphic representation of Fig. 5 the relief is shown by means of a continuous hatched margin.

Figure 6:
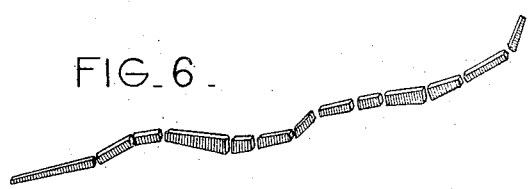

In the representation of Fig. 6 the relief is denoted by means of a conventional design according to which the road forms a chain of prismatic sections.

Figure 7:
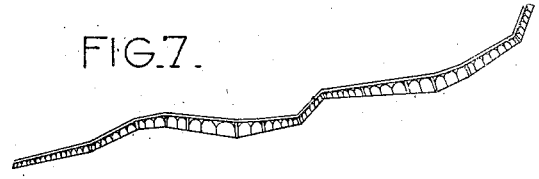

Finally in the method of representation of Fig. 7 the relief is denoted by another conventional device, the road in this case having the appearance of a continuous viaduct in which the arches are of different heights.

It is obvious that the map will still retain its characteristic advantages if certain roads of secondary importance are represented in the usual manner.

Having now described my invention, what I claim as new and desire to secure by Letters Patent is:

1. An improved road map in which the vertical section of a road is shown folded down into the plane of the map throughout the length of the road and along the cartographically accurate line showing the curves of the road, substantially as described and for the purpose set forth.

2. An improved road map in which the vertical section of a road is shown folded down into the plane of the map throughout the length of the road and along the cartographically accurate line showing the curves of the road, one of the lines representing the road serving as the base of the vertical section which is represented by any graphical means, substantially as described and for the purpose set forth.

In testimony whereof I have signed my name to this specification in the presence of two subscribing witnesses.

VICTOR VALLET.

Witnesses:
    Louis Moses,
    Dean B. Mason.